(12) United States Patent
Hohmann

(10) Patent No.: US 7,334,801 B2
(45) Date of Patent: Feb. 26, 2008

(54) AUTOMATED VEHICLE SUSPENSION SYSTEM

(76) Inventor: Michael F. Hohmann, 20 Madder Lake Cir., Commack, NY (US) 11725

( * ) Notice: Subject to any disclaimer, the term of this patent is extended or adjusted under 35 U.S.C. 154(b) by 486 days.

(21) Appl. No.: 11/044,800

(22) Filed: Jan. 28, 2005

(65) Prior Publication Data

US 2006/0173596 A1 Aug. 3, 2006

(51) Int. Cl.
*B60G 17/0165* (2006.01)
*B60G 17/015* (2006.01)
*B60G 23/00* (2006.01)

(52) U.S. Cl. ............ 280/5.518; 280/5.5; 280/5.517; 701/37

(58) Field of Classification Search ............ 280/5.5, 280/5.515, 5.517, 5.518; 701/37, 38
See application file for complete search history.

(56) References Cited

U.S. PATENT DOCUMENTS

| | | | |
|---|---|---|---|
| 4,538,831 A | 9/1985 | Kami et al. | |
| 4,570,969 A | 2/1986 | Tsutsumi et al. | |
| 5,065,618 A * | 11/1991 | Hodges et al. | 73/146 |
| RE34,151 E | 12/1992 | Murakami et al. | |
| 5,347,457 A * | 9/1994 | Tanaka et al. | 701/37 |
| D358,119 S | 5/1995 | Winter | |
| 5,443,282 A * | 8/1995 | Gipser | 280/5.518 |
| 5,450,322 A * | 9/1995 | Tanaka et al. | 701/37 |
| 6,209,887 B1 * | 4/2001 | Kyrtsos | 280/5.515 |
| 6,477,455 B2 * | 11/2002 | Panizzolo | 701/37 |
| 6,502,837 B1 | 1/2003 | Hamilton | |
| 6,665,597 B1 | 12/2003 | Hanser et al. | |
| 7,195,250 B2 * | 3/2007 | Knox et al. | 280/5.518 |
| 2004/0232632 A1 * | 11/2004 | Beck et al. | 280/5.5 |

* cited by examiner

*Primary Examiner*—Paul N. Dickson

(57) ABSTRACT

An automated vehicle suspension system includes an elongated and linear drive axle having opposed end portions pivotally connected to a selected portion of a vehicle and laterally extending outwardly therefrom respectively. The system further includes a mechanism for detecting uneven road surfaces. The detecting mechanism is coupled to the drive axle and housed proximate to a vehicle's wheel. The system further includes a mechanism for automatically articulating the wheel about the drive axle such that the wheel can be selectively raised and lowered from equilibrium to offset an impact force associated with the uneven road surfaces when the vehicle travels thereover during driving conditions. A wheel hub interface is laterally secured to the detecting mechanism such that the drive axle can be maintained at a substantially stable position. A wheel mount is threadably coupled to one end portion of the drive axle and outwardly spaced from the wheel hub interface.

18 Claims, 7 Drawing Sheets

AUTOMATED VEHICLE SUSPENSION SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to automatic suspension control systems and, more particularly, to an automatic vehicle suspension system that includes a sensor for detects imminent uneven road surfaces and automatically adjusts the vehicle's suspension accordingly.

2. Prior Art

Ride-height control systems for motor homes and recreational vehicles are well known in the art. These systems typically utilize air suspension systems which permit the distance between the axles and chassis to be adjusted according to the amount of pressure within the air bags. The ride-height of the vehicle may therefore be adjusted for varying loading conditions, road conditions, wind, and rough terrain. Systems for maintaining a particular ride-height for varying conditions generally utilize a vehicle pneumatic system, comprised of an air compressor and air tank, and a pneumatic valve connected to each of the vehicle air bags. Each of the valves is secured to the vehicle chassis and connected to the vehicle axle by means of a mechanical linkage. As the distance between the chassis and axle fluctuates, air is supplied to, or vented from, each air bag through its respective valve.

These systems are unsatisfactory for a number of reasons. First ,is the requirement for manually adjusting each valve linkage to select a new ride height as environmental conditions change. Second, these systems utilize a great deal of air, and therefore put a constant drain on the vehicle pneumatic system, due to the constant transfer of air into and out of the bags as the chassis and axle oscillate and the system "hunts" for the proper setting. Further, with known systems, adjusting the sensitivity of the system for different quality of ride requires changing the pneumatic.

Accordingly, a need remains for an automated suspension system that overcomes the above-noted shortcomings. The present invention satisfies such a need by providing an automated wheel suspension system that detects uneven road terrain and adjusts the drive axle accordingly in order to compensate and absorb the shocks and impact of potholes and other road abnormalities. Such a system improves safety and helps to reduce accidents caused by a driver losing control of the vehicle after impacting a pothole.

BRIEF SUMMARY OF THE INVENTION

In view of the foregoing background, it is therefore an object of the present invention to provide an automated vehicle suspension system. These and other objects, features, and advantages of the invention are provided by a vehicle suspension system for detecting uneven road surfaces in an approaching vehicle's path of travel.

The system includes an elongated and linear drive axle having opposed end portions pivotally connected to a selected portion of a vehicle and laterally extending outwardly therefrom respectively. The system further includes a mechanism for detecting the uneven road surfaces while the vehicle is in transit. The detecting mechanism is coupled to the drive axle and housed proximate to a vehicle's wheel such that the detecting mechanism can effectively detect an uneven road surface in an approaching vehicle's path of travel The system further includes a mechanism for automatically articulating the wheel about the drive axle such that the wheel can be selectively raised and lowered from equilibrium to offset an impact force associated with the uneven road surfaces when the vehicle travels thereover during driving conditions. A wheel hub interface is laterally secured to the detecting mechanism such that the drive axle can be maintained at a substantially stable position. A wheel mount is threadably coupled to one end portion of the drive axle and outwardly spaced from the wheel hub interface such that the wheel mount can be removably attached to a wheel rim and cooperate with the articulating mechanism during driving conditions.

The detecting mechanism preferably includes a protective casing provided with a transparent window sized and shaped along an outer wall of the casing. A sensor is housed within the protective casing and is positioned adjacent the transparent window such that the sensor can effectively maintain a continuous line of sight along the travel path. The sensor generates input signals corresponding to the dimensional characteristics of the road surface. The sensor preferably includes one sensor selected from the group including an optical sensor, an infrared sensor, and a Doppler sensor.

A preprogrammed processor is electrically coupled to the sensor for receiving the input signals and mapping the road surface during transit. Such a processor instructs the articulating mechanism to oscillate the drive axle from equilibrium as the vehicle approaches uneven terrain.

The articulating mechanism includes a spherical shell mated with the housing such that the shell can be maintained at a static position during transit. The shell is provided with a slot for laterally guiding the drive axle therethrough and defining a maximum arcuate path along which the drive axle can be articulated. A plurality of actuators having opposed end portions are secured to an inner wall of the casing and a selected portion of the drive axle respectively. The actuators are electrically coupled to the processor and controlled thereby such that one actuator can be adapted between extended and retracted positions while another of the actuators is adapted between retracted and extended positions respectively. Such actuators cooperate with the drive axle wherein the drive axle can be articulated about a pivot point disposed within the casing.

The wheel hub interface preferably includes an annular central portion provided with a plurality of apertures formed therein. The casing may be provided with a plurality of integrally protruding fasteners threadably insertable through the central portion apertures. The central portion may further have a pair of integrally connected and spaced flange portions extending outwardly from a perimeter of the central portion and offset from a vertical axis such that the flange portions preferably terminate outwardly and away from the perimeter. Each of the flange portions may be provided with an opening for receiving a fastening member therethrough and being secured to a selected portion of the vehicle.

One end portion of the drive axle is threaded and the wheel mount is provided with a centrally oriented aperture aligned with the horizontal axis for securely receiving the threaded drive axle end portion therethrough. Such a wheel mount preferably includes a plurality of integrally mated finger portions extending laterally from an outer surface of the wheel mount such that the wheel hub interface may be readily coupled to a variety of wheels as desired by a user.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
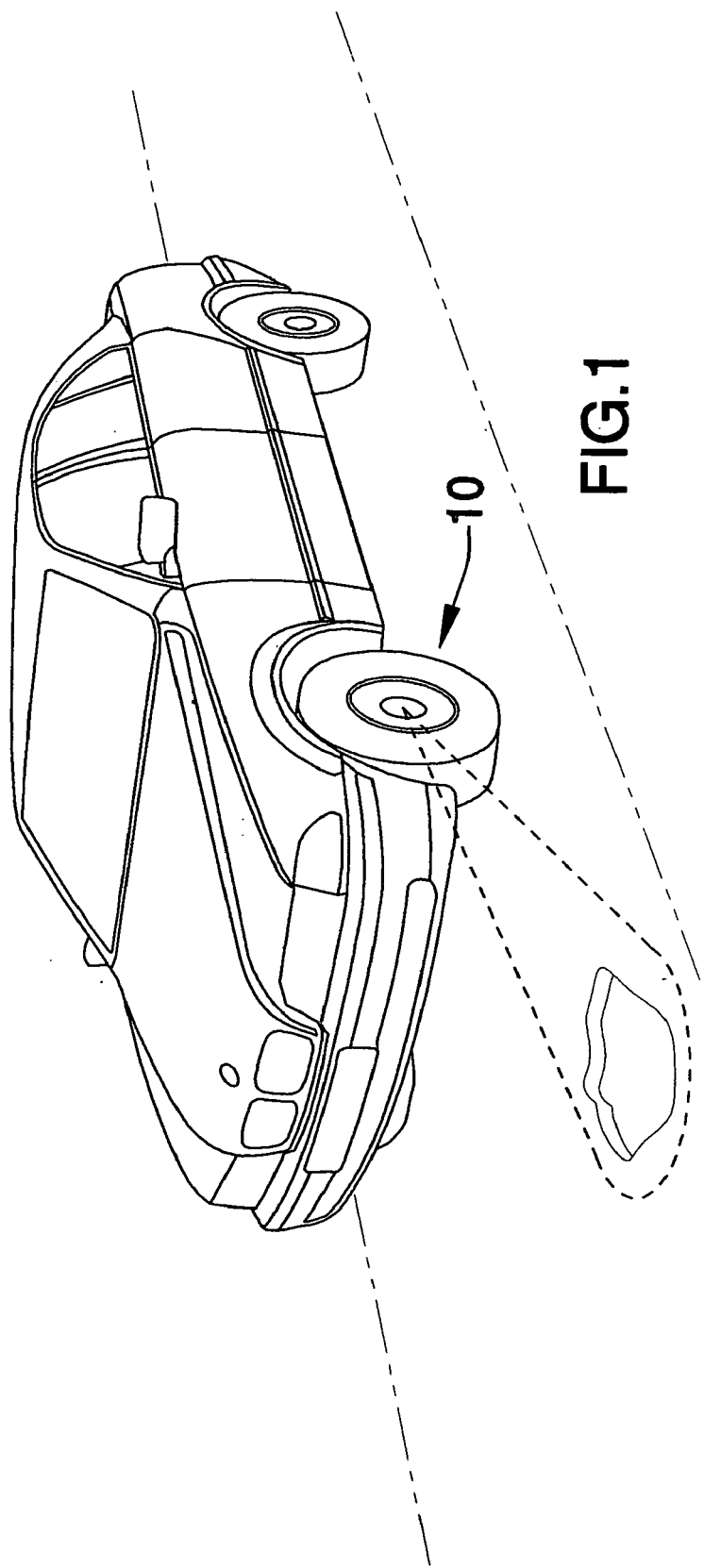
FIG. 1 is a perspective view showing an automated vehicle suspension system in a preferred environment, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide a system for detecting uneven road services in an approaching vehicle's path of travel. It should be understood that the system 10 may be used to detect many different types of objects and should not be limited to detecting only uneven road surfaces.

Figure 2:
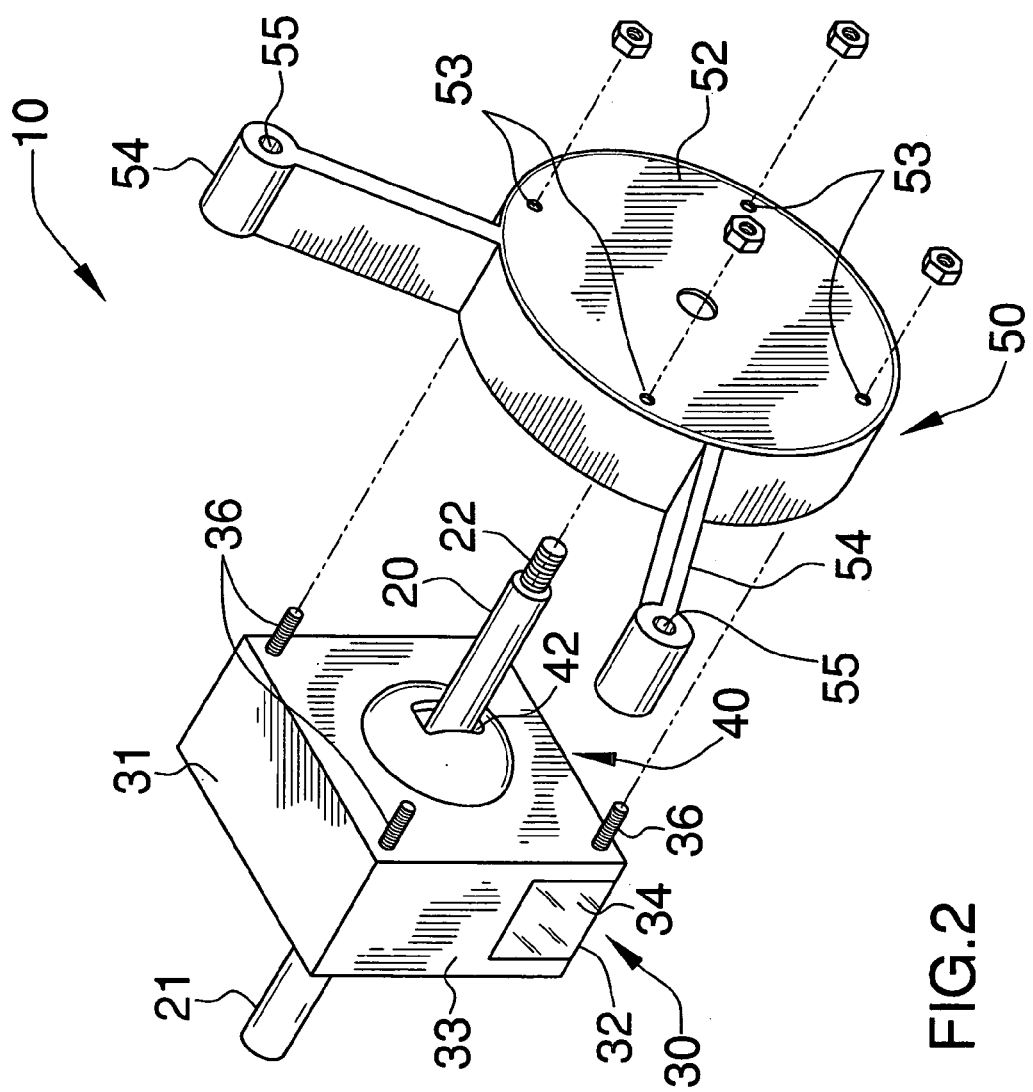
FIG. 2 is an exploded perspective view showing the detecting mechanism and wheel hub interface.
Figure 3:
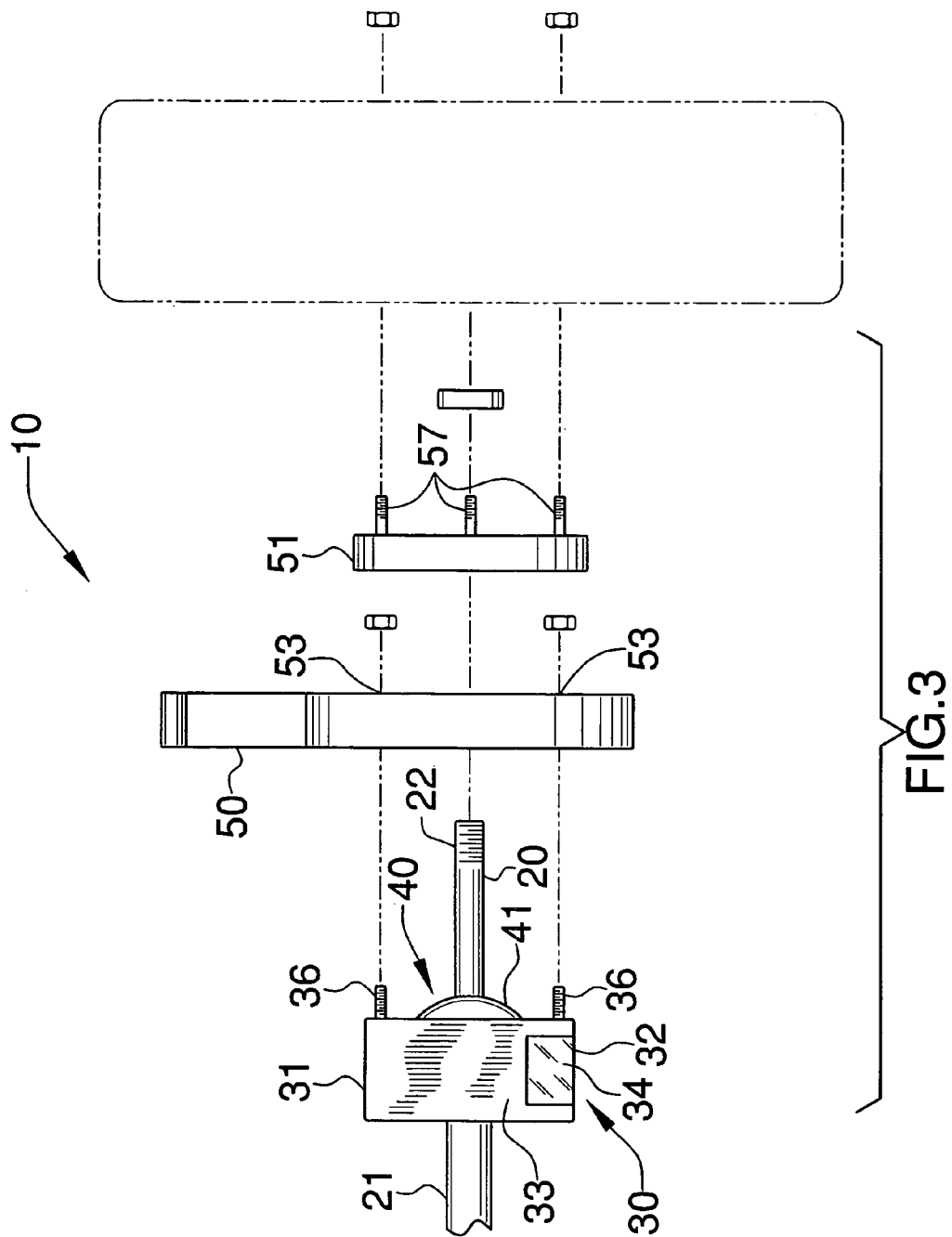
FIG. 3 is an exploded top plan view of the detecting mechanism and wheel hub interface.
Figure 4:
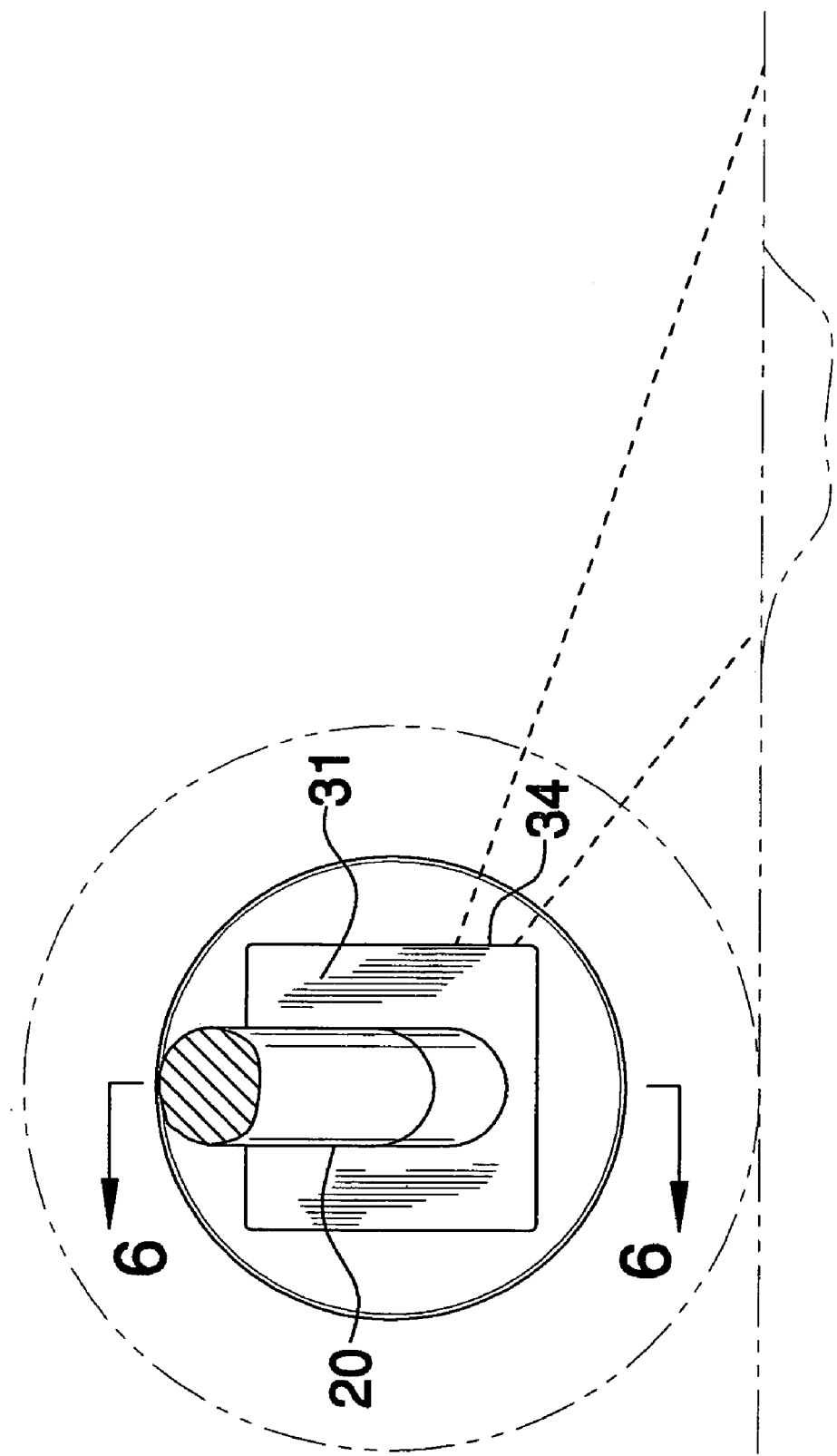
FIG. 4 is a perspective view showing the detecting mechanism in a preferred environment during operating conditions.
Figure 5:
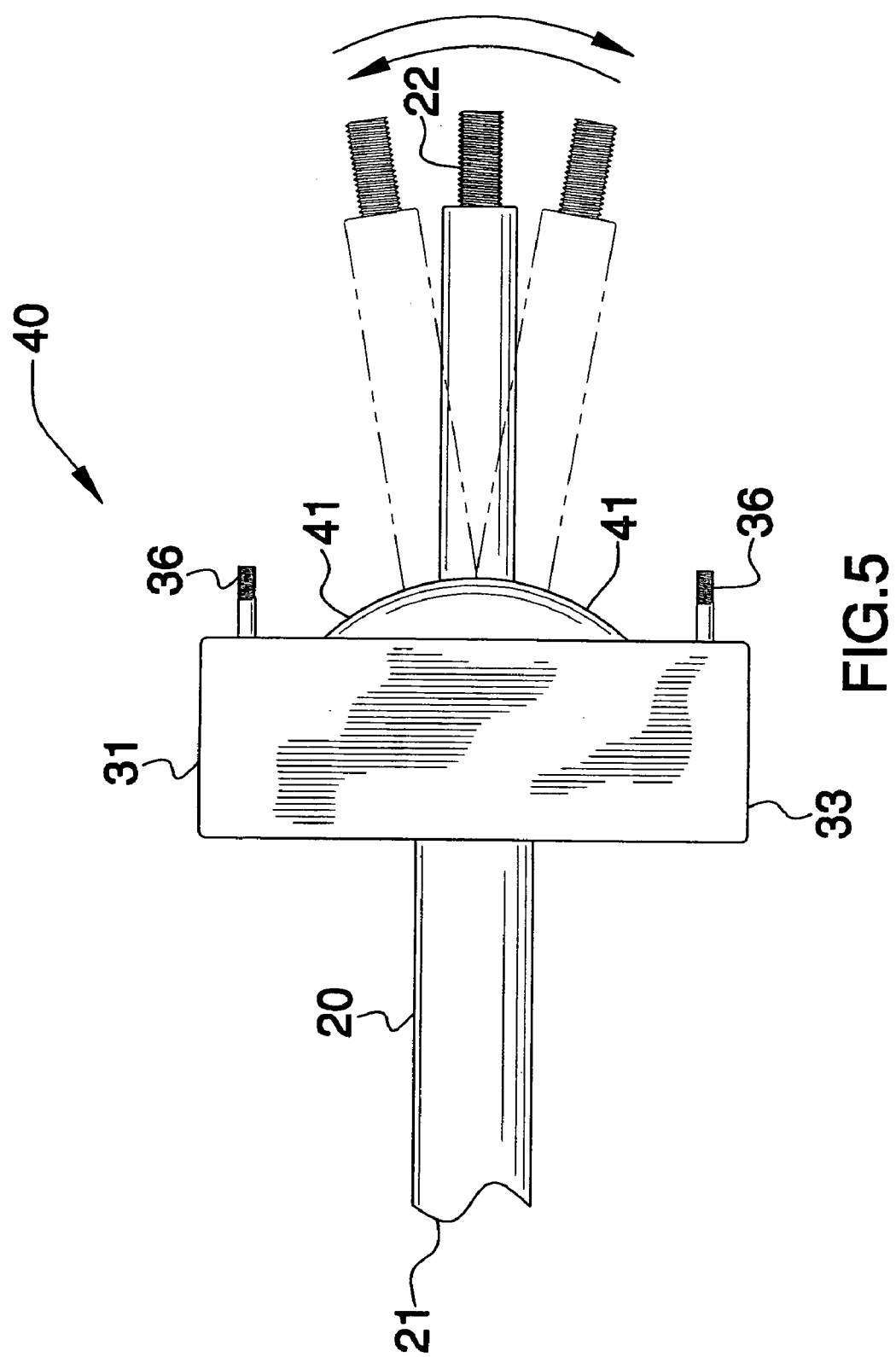
FIG. 5 is a side elevational view illustrating the articulating mechanism oscillating the drive axle.

Initially referring to FIGS. 2 and 3, the system 10 includes an elongated and linear drive axle 20 having opposed end portions 21, 22 pivotally connected to a selected portion of a vehicle and laterally extending outwardly therefrom respectively. The system 10 further includes a mechanism 30 for detecting uneven road surfaces while the vehicle is in transit. The detecting mechanism 30 is coupled to the drive axle 20 and housed proximate to a vehicle's wheel such that the detecting mechanism 30 can effectively detect an uneven road surface in an approaching vehicle's path of travel, as shown in FIG. 1. By detecting potholes and other road abnormalities in advance, such a system 10 is able to adjust the suspension system of the vehicle to absorb the shock and impact. This helps prevent serious pothole-related damage to the tires, rims, and suspension systems, while also making the vehicle easier and safer to control.

Referring to FIGS. 2-7, the system 10 further includes a mechanism 40 for automatically articulating the wheel about the drive axle 20 such that the wheel can be selectively raised and lowered from equilibrium to offset an impact force associated with the uneven road surfaces when the vehicle travels thereover during driving conditions. A wheel hub interface 50 is laterally secured to the detecting mechanism 30 such that the drive axle 20 can be maintained at a substantially stable position. This feature helps a diver maintain control of the vehicle when hitting a pothole. It also helps prevent tire damage and blowouts, and front end or rim damage. In addition, the oscillating movement of the drive axle 20 helps prevent costly damage to the drive axle 20. When the system 10 senses a pothole or other irregularity in the road, the drive axle 20 is raised or lowered accordingly, enabling the whell to enter and exit the pothole with little or no effect on the drive axle 20. A wheel mount 51 is threadably coupled to one end portion 22 of the drive axle 20 and outwardly spaced from the wheel hub interface 50 such that the wheel mount 51 can be removably attached to a wheel rim and cooperate with the articulating mechanism 40 during driving conditions.

Referring to FIGS. 2 and 3, the detecting mechanism 30 includes a protective casing 31 provided with a transparent window 32 sized and shaped along an outer wall 33 of the casing 31. The casing 31 prevents dirt and other road contaminants from negatively impacting the function of the detecting mechanism 30. A sensor 34 is housed within the protective casing 31 and is positioned adjacent the transparent window 32 such that the sensor 34 can effectively maintain a continuous line of sight along the travel path. The sensor 34 generates input signals corresponding to the dimensional characteristics of the road surface. The sensor 34 includes one sensor selected from the group including an optical sensor, an infrared sensor, and a Doppler sensor. Such a selection enables a user to choose a sensor 34 best suited to driving conditions most often encountered.

Figure 7:
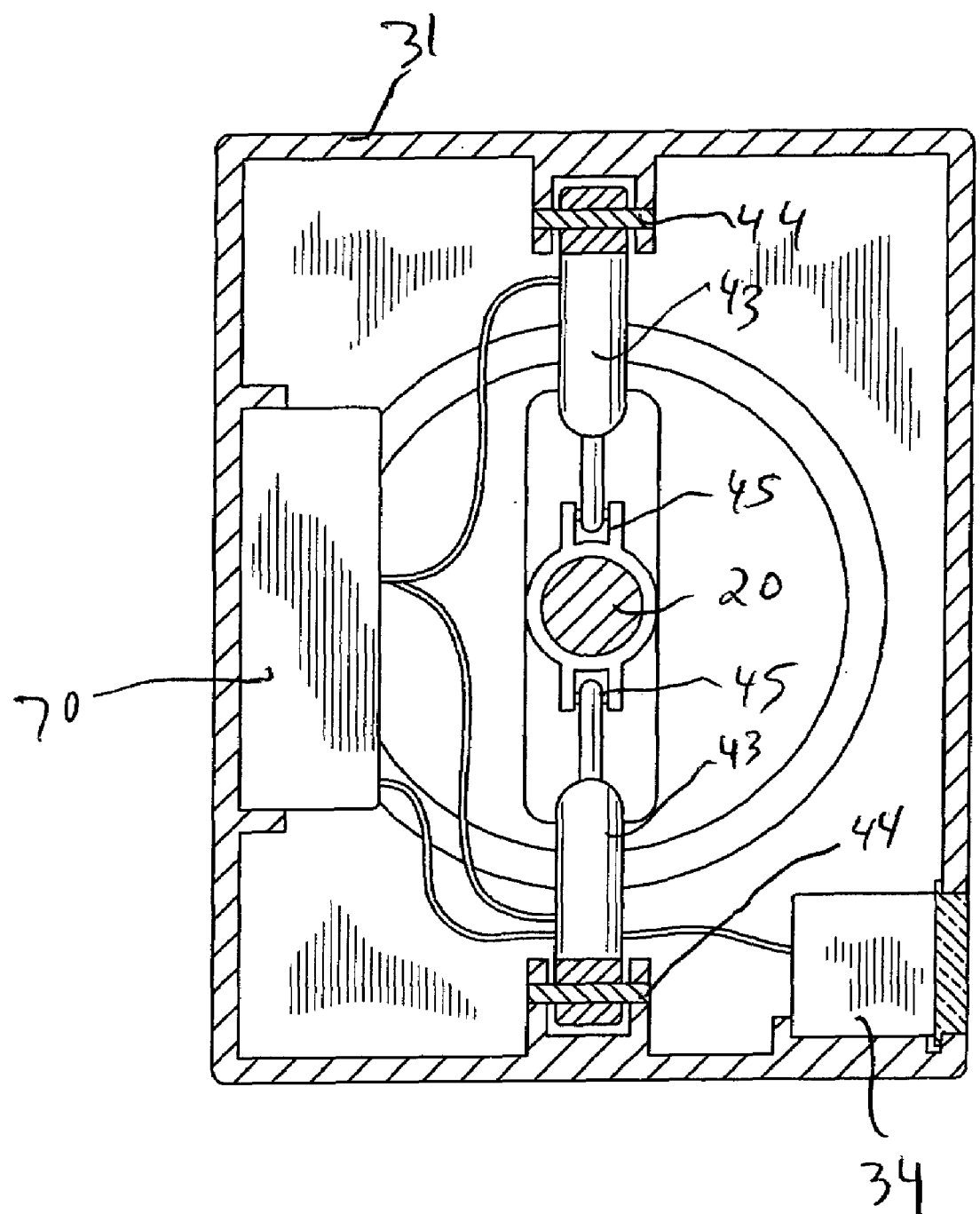
FIG. 7 is an enlarged cross-sectional view of the present invention shown in FIG. 6, taken along line 7-7.

Referring to FIG. 7, a preprogrammed processor 70 is electrically coupled to the sensor 34 for receiving the input signals and mapping the road surface during transit. Such a processor 70 instructs the articulating mechanism 40 to oscillate the drive axle 20 from equilibrium as the vehicle approaches uneven terrain. The processor 70 ensures that the system 10 is operational only when the vehicle is in motion, and therefore does not respond to objects surrounding it when the vehicle is stationary.

Figure 6:
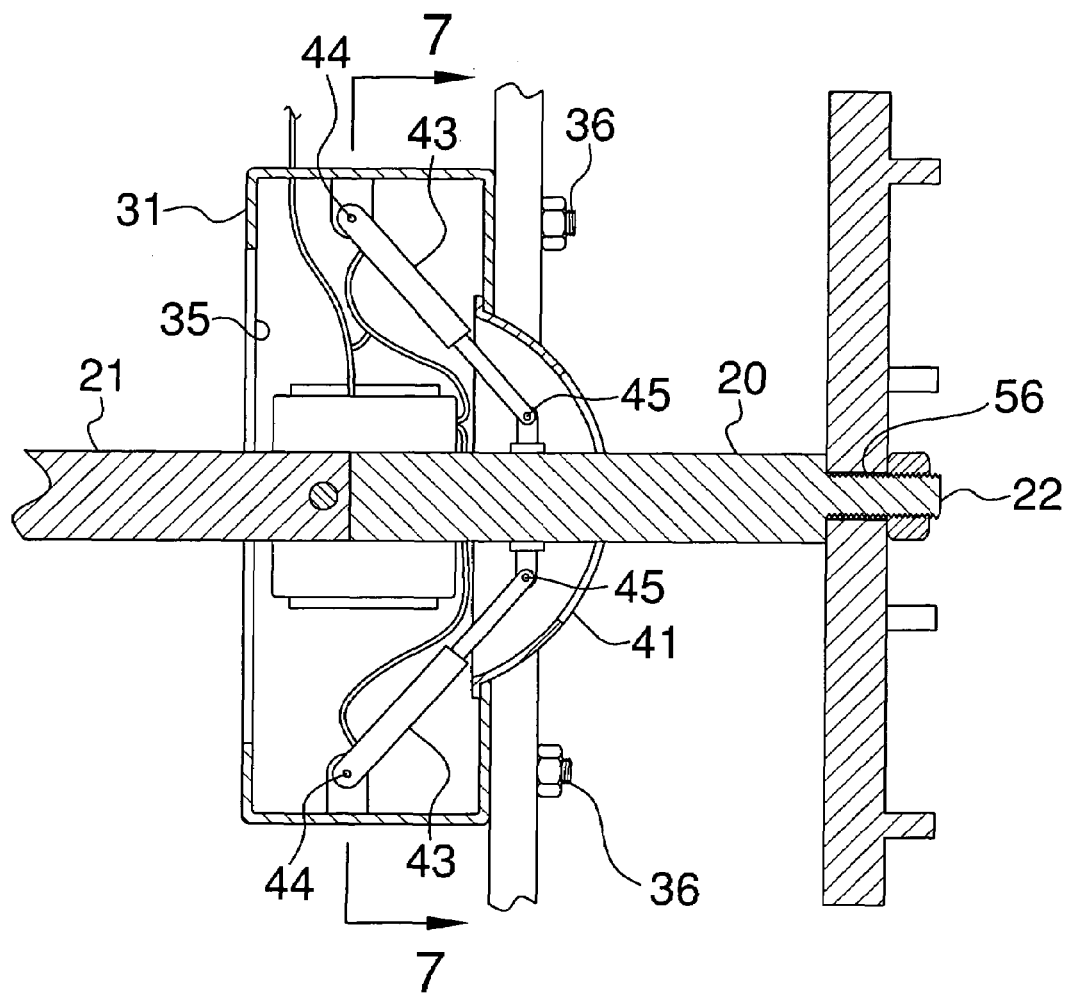
FIG. 6 is a cross-sectional view of the present invention shown in FIG. 4, taken along line 6-6.

Referring to FIGS. 6 and 7, the articulating mechanism 40 includes a spherical shell 41 mated with the housing such that the shell 41 can be maintained at a static position during transit. The shell 41 is provided with a slot 42 for laterally guiding the drive axle 20 therethrough and defining a maximum arcuate path along which the drive axle 20 can be articulated. A plurality of actuators 43 having opposed end portions 44, 45 are secured to an inner wall 35 of the casing 31 and a selected portion of the drive axle 20 respectively. The actuators 43 are electrically coupled to the processor 70 and controlled thereby such that one actuator 43 can be adapted between extended and retracted positions while another of the actuators 43 is adapted between retracted and extended positions respectively. Such actuators 43 cooperate with the drive axle 20 wherein the drive axle 20 can be articulated about a pivot point disposed within the casing 31.

Referring to FIG. 2, the wheel hub interface 50 preferably includes an annular central portion 52 provided with a plurality of apertures 53 formed therein. The casing 31 may be provided with a plurality of integrally protruding fasteners 36 threadably insertable through the central portion apertures 53. The central portion 52 may further have a pair of integrally connected and spaced flange portions 54 extending outwardly from a perimeter of the central portion 52 and offset from a vertical axis such that the flange portions 54 preferably terminate outwardly and away from the perimeter. Each of the flange portions 54 may be provided with an opening 55 for receiving a fastening member (not shown) therethrough and being secured to a selected portion of the vehicle.

Referring to FIGS. 2 and 3, one end portion 22 of the drive axle 20 is threaded and the wheel mount 51 is provided with a centrally oriented aperture 56 aligned with the horizontal axis for securely receiving the threaded drive axle end portion 22 therethrough. Such a wheel mount 51 preferably includes a plurality of integrally mated finger portions 57 extending laterally from an outer surface of the wheel mount 51 such that the wheel hub interface 50 may be readily coupled to a variety of wheels as desired by a user. Such an interface 50 enables the system 10 to be adapted for use on most passenger vehicles, pickup trucks, and other commercial vehicles.

The system 10 ensures a smooth and comfortable ride for all passengers while also protecting the tire, rims and suspension from serious harm. The smooth ride provides the driver with better control over the steering and handling. This improves driver confidence behind the wheel and helps prevent accidents caused by damaged roads. Such a system 10 is ideally suited for new production cars and light trucks and may also be marketed in the automotive aftermarket.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle suspension system for detecting uneven road surfaces in an approaching vehicle's path of travel, said system comprising:

a drive axle having opposed end portions operably connected to a selected portion of a vehicle and laterally extending outwardly therefrom respectively;

means for detecting the uneven road surfaces while the vehicle is in transit, said detecting means being coupled to said drive axle and housed proximate to a vehicle's wheel such that said detecting means can effectively detect an uneven road surface in an approaching vehicle's path of travel;

means for articulating the wheel about said drive axle such that the wheel can be selectively raised and lowered from equilibrium to offset an impact force associated with the uneven road surfaces when the vehicle travels thereover during driving conditions;

a wheel hub interface laterally secured to said detecting means such that said drive axle can be maintained at a substantially stable position; and a wheel mount threadably coupled to one said end portion of said drive axle and outwardly spaced from said wheel hub interface such that said wheel mount can be removably attached to a wheel rim and cooperate with said articulating means during driving conditions.

2. The system of claim 1, wherein said detecting means comprises:

a protective casing provided with a transparent window sized and shaped along an outer wall of said casing;

a sensor housed within said protective casing and being positioned adjacent said transparent window such that said sensor can effectively maintain a continuous line of sight along the travel path, said sensor generating input signals corresponding to the dimensional characteristics of the road surface; and a preprogrammed processor electrically coupled to said sensor for receiving the input signals and mapping the road surface during transit, said processor instructing said articulating means to oscillate said drive axle from equilibrium as the vehicle approaches uneven terrain.

3. The system of claim 2, wherein said articulating means comprises:

a spherical shell mated with said casing such that said shell can be maintained at a static position during transit, said shell being provided with a slot for laterally guiding said drive axle therethrough and defining a maximum arcuate path along which said drive axle can be articulated; and a plurality of actuators having opposed end portions secured to an inner wall of said casing and a selected portion of said drive axle respectively, said actuators being electrically coupled to said processor and controlled thereby such that one of said actuators can be adapted between extended and retracted positions while another one of said actuators is adapted between retracted and extended positions respectively, said actuators cooperating with said drive axle wherein said drive axle can be articulated about a pivot point disposed within said casing.

4. The system of claim 1, wherein said wheel hub interface comprises:

an annular central portion provided with a plurality of apertures formed therein, said casing being provided with a plurality of integrally protruding fasteners threadably insertable through the central portion apertures, said central portion further having a pair of integrally connected and spaced flange portions extending outwardly from a perimeter of said central portion and offset from a vertical axis such that said flange portions terminate outwardly and away from the perimeter, each of said flange portions being provided with an opening for receiving a fastening member therethrough and being secured to a selected portion of the vehicle.

5. The system of claim 1, wherein said one end portion of said drive axle is threaded, said wheel mount being provided with a centrally oriented aperture aligned with the a horizontal axis for securely receiving said threaded drive axle end portion therethrough, said wheel mount including a plurality of integrally mated finger portions extending laterally from an outer surface of said wheel mount such that said wheel hub interface can be readily coupled to a variety of wheels as desired by a user.

6. The system of claim 2, wherein said sensor comprises: one of an optical sensor, an infrared sensor, and a Doppler sensor.

7. A vehicle suspension system for detecting uneven road surfaces in an approaching vehicle's path of travel, said system comprising:
an elongated and linear drive axle having opposed end portions operably connected to a selected portion of a vehicle and laterally extending outwardly therefrom respectively;
means for detecting the uneven road surfaces while the vehicle is in transit, said detecting means being coupled to said drive axle and housed proximate to a vehicle's wheel such that said detecting means can effectively detect an uneven road surface in an approaching vehicle's path of travel;
means for articulating the wheel about said drive axle such that the wheel can be selectively raised and lowered from equilibrium to offset an impact force associated with the uneven road surfaces when the vehicle travels thereover during driving conditions;
a wheel hub interface laterally secured to said detecting means such that said drive axle can be maintained at a substantially stable position; and
a wheel mount threadably coupled to one said end portion of said drive axle and outwardly spaced from said wheel hub interface such that said wheel mount can be removably attached to a wheel rim and cooperate with said articulating means during driving conditions.

8. The system of claim 7, wherein said detecting means comprises:
a protective casing provided with a transparent window sized and shaped along an outer wall of said casing;
a sensor housed within said protective casing and being positioned adjacent said transparent window such that said sensor can effectively maintain a continuous line of sight along the travel path, said sensor generating input signals corresponding to the dimensional characteristics of the road surface; and
a preprogrammed processor electrically coupled to said sensor for receiving the input signals and mapping the road surface during transit, said processor instructing said articulating means to oscillate said drive axle from equilibrium as the vehicle approaches uneven terrain.

9. The system of claim 8, wherein said articulating means comprises:
a spherical shell mated with said casing such that said shell can be maintained at a static position during transit, said shell being provided with a slot for laterally guiding said drive axle therethrough and defining a maximum arcuate path along which said drive axle can be articulated; and
a plurality of actuators having opposed end portions secured to an inner wall of said casing and a selected portion of said drive axle respectively, said actuators being electrically coupled to said processor and controlled thereby such that one of said actuators can be adapted between extended and retracted positions while another one of said actuators is adapted between retracted and extended positions respectively, said actuators cooperating with said drive axle wherein said drive axle can be articulated about a pivot point disposed within said casing.

10. The system of claim 7, wherein said wheel hub interface comprises:
an annular central portion provided with a plurality of apertures formed therein, said casing being provided with a plurality of integrally protruding fasteners threadably insertable through the central portion apertures, said central portion further having a pair of integrally connected and spaced flange portions extending outwardly from a perimeter of said central portion and offset from a vertical axis such that said flange portions terminate outwardly and away from the perimeter, each of said flange portions being provided with an opening for receiving a fastening member therethrough and being secured to a selected portion of the vehicle.

11. The system of claim 7, wherein said one end portion of said drive axle is threaded, said wheel mount being provided with a centrally oriented aperture aligned with the a horizontal axis for securely receiving said threaded drive axle end portion therethrough, said wheel mount including a plurality of integrally mated finger portions extending laterally from an outer surface of said wheel mount such that said wheel hub interface can be readily coupled to a variety of wheels as desired by a user.

12. The system of claim 8, wherein said sensor comprises: one of an optical sensor, an infrared sensor, and a Doppler sensor.

13. A vehicle suspension system for detecting uneven road surfaces in an approaching vehicle's path of travel, said system comprising:
an elongated and linear drive axle having opposed end portions pivotally connected to a selected portion of a vehicle and laterally extending outwardly therefrom respectively;
means for detecting the uneven road surfaces while the vehicle is in transit, said detecting means being coupled to said drive axle and housed proximate to a vehicle's wheel such that said detecting means can effectively detect an uneven road surface in an approaching vehicle's path of travel;
means for automatically articulating the wheel about said drive axle such that the wheel can be selectively raised and lowered from equilibrium to offset an impact force associated with the uneven road surfaces when the vehicle travels thereover during driving conditions;
a wheel hub interface laterally secured to said detecting means such that said drive axle can be maintained at a substantially stable position; and
a wheel mount threadably coupled to one said end portion of said drive axle and outwardly spaced from said wheel hub interface such that said wheel mount can be removably attached to a wheel rim and cooperate with said articulating means during driving conditions.

14. The system of claim 13, wherein said detecting means comprises:
a protective casing provided with a transparent window sized and shaped along an outer wall of said casing;
a sensor housed within said protective casing and being positioned adjacent said transparent window such that said sensor can effectively maintain a continuous line of sight along the travel path, said sensor generating input signals corresponding to the dimensional characteristics of the road surface; and a preprogrammed processor electrically coupled to said sensor for receiving the input signals and mapping the road surface during transit, said processor instructing said articulating means to oscillate said drive axle from equilibrium as the vehicle approaches uneven terrain.

15. The system of claim 14, wherein said articulating means comprises:

a spherical shell mated with said casing such that said shell can be maintained at a static position during transit, said shell being provided with a slot for laterally guiding said drive axle therethrough and defining a maximum arcuate path along which said drive axle can be articulated; and a plurality of actuators having opposed end portions secured to an inner wall of said casing and a selected portion of said drive axle respectively, said actuators being electrically coupled to said processor and controlled thereby such that one of said actuators can be adapted between extended and retracted positions while another one of said actuators is adapted between retracted and extended positions respectively, said actuators cooperating with said drive axle wherein said drive axle can be articulated about a pivot point disposed within said casing.

16. The system of claim 13, wherein said wheel hub interface comprises:

an annular central portion provided with a plurality of apertures formed therein, said casing being provided with a plurality of integrally protruding fasteners threadably insertable through the central portion apertures, said central portion further having a pair of integrally connected and spaced flange portions extending outwardly from a perimeter of said central portion and offset from a vertical axis such that said flange portions terminate outwardly and away from the perimeter, each of said flange portions being provided with an opening for receiving a fastening member therethrough and being secured to a selected portion of the vehicle.

17. The system of claim 13, wherein said one end portion of said drive axle is threaded, said wheel mount being provided with a centrally oriented aperture aligned with the a horizontal axis for securely receiving said threaded drive axle end portion therethrough, said wheel mount including a plurality of integrally mated finger portions extending laterally from an outer surface of said wheel mount such that said wheel hub interface can be readily coupled to a variety of wheels as desired by a user.

18. The system of claim 14, wherein said sensor comprises: one of an optical sensor, an infrared sensor, and a Doppler sensor.

* * * * *